Figure 1:
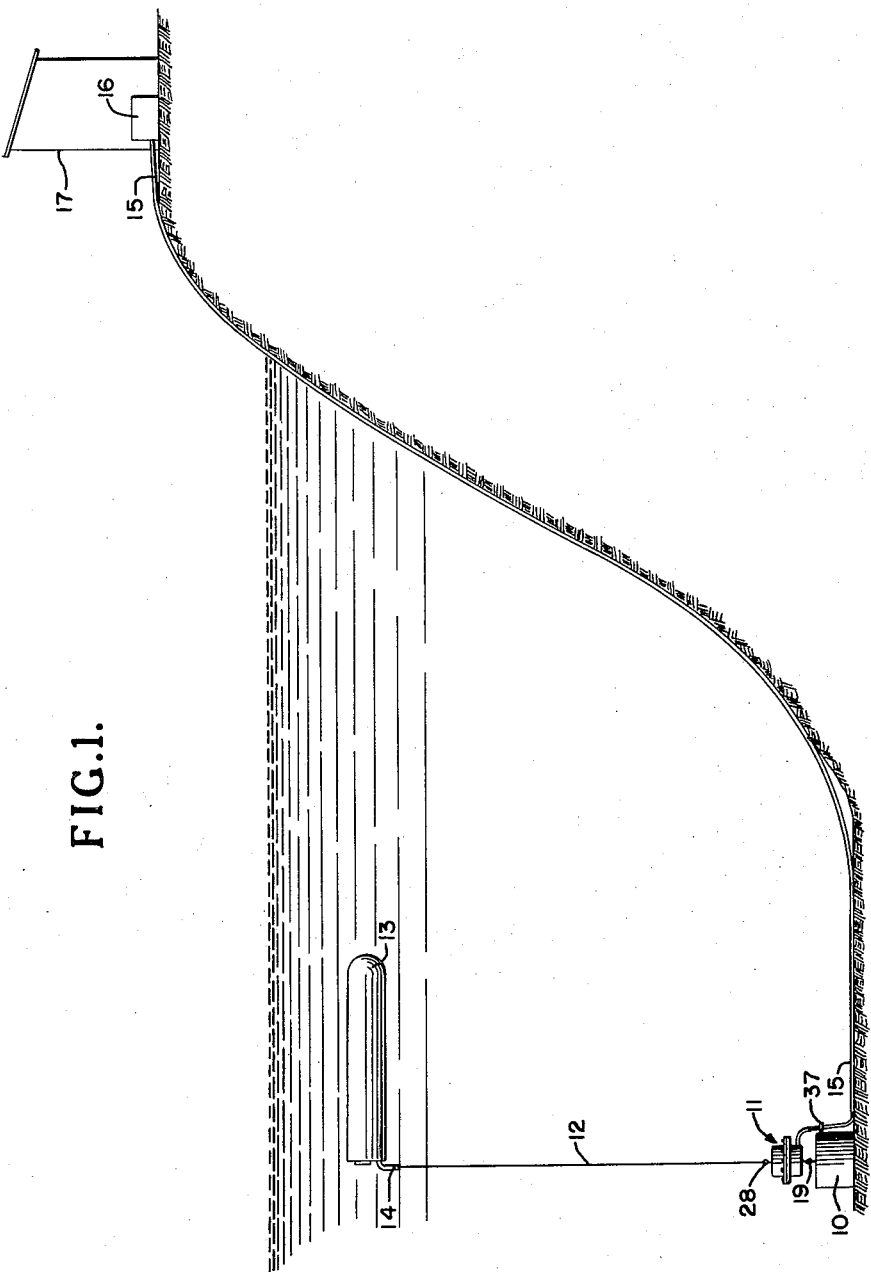

March 13, 1962

W. P. CHRISTOPH 3,024,645

VIBRATORY DYNAMIC FORCE METER

Filed June 5, 1958

2 Sheets-Sheet 2

INVENTOR.
W. P. CHRISTOPH

BY
ATTORNEYS.

United States Patent Office 3,024,645
Patented Mar. 13, 1962

3,024,645
VIBRATORY DYNAMIC FORCE METER
Walter P. Christoph, Riverdale, Md., assignor to the United States of America as represented by the Secretary of the Navy
Filed June 5, 1958, Ser. No. 740,173
6 Claims. (Cl. 73—71.4)
(Granted under Title 35, U.S. Code (1952), sec. 266)

The invention described herein may be manufactured and used by or for the Government of the United States of America for governmental purposes without the payment of any royalties thereon or therefor.

This invention relates to a dynamic force meter and more particularly to a detector and transducing device for measuring the cable strumming effect of a moored underwater marine mine.

It has been found that an underwater marine mine when moored beneath the surface of the water by a mooring cable and anchor arrangement, exerts an upward pull against the anchor of considerable magnitude, in many cases, of the order of several hundred pounds. This buoyant force causes the cable to be in continuous tension and if the mine should be planted within the water at such a location that it is subject to tidal currents, the pull of the current against the taut cable causes the cable to be set into vibration, a condition referred to herein as strumming. When the mechanism within the mine is of the type adapted to be fired in response to a vibratory acoustic signal received thereby, it has been found that this strumming action not only causes the amplifier within the mine to become overloaded but may in some cases result in prematurely firing the mine. It has therefore become necessary, in the design of mine firing mechanisms of this type to measure the vibratory forces caused by strumming of the cable in response to tidal currents and to employ this information in the design of the mine firing mechanism.

It has been the usual practice, heretofore, in a measurement of cable strumming when the moored mine and cable are subjected to tidal current, to employ geophones, test monitors and strain gages secured to the cable for measuring the cable strumming. These devices possess the disadvantage of being difficult to handle, furthermore they require an excess amount of power for operation and do not cover a wide range of frequencies.

The device of the present invention possesses all of the advantages of the prior art devices and none of the foregoing disadvantages. In accordance with the present invention this is accomplished by employing a massive casing serially connected between the lower end of the mooring cable and the mine anchor and having a flexible element thereof to which the mooring cable is secured and preloaded by the positive buoyancy of the mine. Movement of this flexible member in response to the strumming action of the cable is detected by a strain gage secured thereto and composed of barium titanate or the like for generating electrical signals correlative with the force of the vibratory movement applied by the cable to the flexible member. The signals thus generated are amplified and passed by way of a submarine cable to a recorder located at a shore station, as will more clearly appear as the description proceeds.

One of the objects of the present invention is the provision of a new and improved dynamic force meter for use with a rapidly vibrating cable secured thereto.

Another of the objects is to provide a new and improved device for measuring vibrating forces over a wide range of frequencies while a static load is applied thereto.

A further object is the provision of a new and improved detector and transducing device for measuring cable strumming effects within a wide range of frequencies.

A still further object is the provision of a dynamic force meter having new and improved means for measuring the strumming effect of a mooring cable for a submerged marine mine as the result of tidal currents thereagainst.

Figure 2:
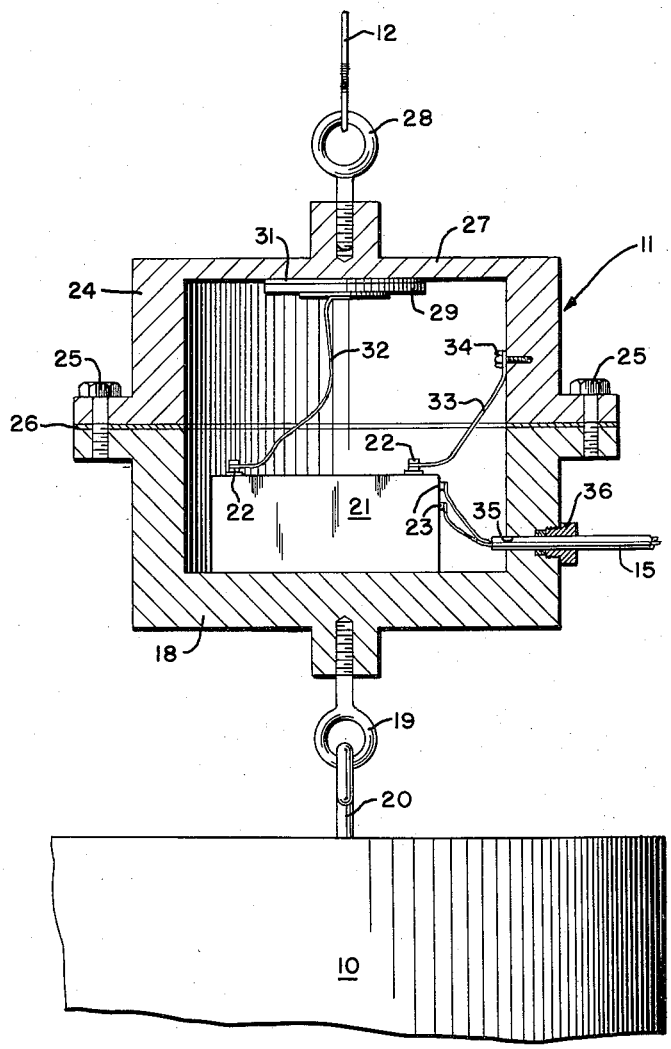

Still other objects, advantages and improvements will be apparent from the following description taken in connection with the accompanying drawings in which:

FIG. 1 is a view in elevation of a complete system for recording the strumming of a mooring cable for a mine employing the device of the present invention according to a preferred form thereof; and FIG. 2 is a sectional view in elevation somewhat enlarged of the detecting and transducing device of FIG. 1.

Referring now to the drawings for a more complete understanding of the invention on which like numerals of reference are employed to designate like or similar parts throughout the several views and more particularly to FIG. 1 thereof, there is shown thereon an anchor 10 to which is pivotally secured the detecting and transducing device of the present invention generally indicated by the numeral 11 to which is connected one end of a mooring cable 12. The other end of the mooring cable is connected to a mine 13 by way of an arm 14 depending therefrom. The mine may be of any type suitable for the purpose having positive buoyancy and means for mooring beneath the surface of the water such, for example, as the mine disclosed and claimed in Patent 2,789,503 for Mooring Device for a Submarine Mine, issued to J. B. Glennon et al. April 23, 1957. The detecting device 11 is connected by way of an electrical cable 15 to a recorder 16 located at a shore station 17.

The device 11, as more clearly shown on FIG. 2, comprises a heavy casing 18 having an eye bolt 19 secured to the lower portion thereof for establishing pivotal movement to the anchor 10 secured thereto. There is enclosed within the casing 18 an amplifier 21 having a pair of input terminals 22 and a pair of output terminals 23. The amplifier may be of any type suitable for the purpose such, for example, as a type known as a transistor amplifier in which the rectifying and amplifying elements are comprised of transistor elements requiring but a small amount of electrical energy for their operation. This energy may be supplied, if desired, by a battery included within the amplifier housing.

There is secured to the casing 18 a complementary casing 24 as by the bolts 25, a suitable gasket 26 being employed therebetween to effect a watertight seal when the bolts are tightened. The casing 24 comprises a flat upper portion or wall 27 of less thickness than the thickness of the circular side walls of casings 24 and 18 and the bottom wall of casing 18. The upper wall 27 has secured thereto in any suitable manner an eye bolt 28 for establishing a connection to one end of cable 12 whereby the wall 27 is prebiased by a static load applied thereto by the mine due to the positive buoyancy thereof and flexed synchronously with the vibrations received from the cable as the result of a strumming action thereof when the cable is acted upon by tidal currents.

A piezo-electric element such, for example, as the barium titanate element 29 illustrated is secured interiorly to the wall 27 at a central portion thereof by a cement indicated at 31 having electrical properties such that one terminal of the barium titanate element is in electrical contact with casing 24. The other terminal of the piezoelectric element is connected by conductor 32 to one of the input terminals 22 of the amplifier, the other terminal 22 being connected by conductor 33 to casing 24 in any suitable manner as by bolt 34. An arrangement is thus provided in which the electrical signals are generated by the piezo-electric element 29 in response to variations in flexure of the top wall 27 caused by strumming of cable 12.

The casing 18 is provided with an aperture 35 within which is disposed an end portion of cable 15 having a pair of electrical conductors therein connected to the output terminals 23 of the amplifier. A water gland 36 is provided to maintain a waterproof seal between the cable 15 and the casing 18. The cable 15, if desired, may be secured as at 37, FIG. 1, to the anchor.

In operation the upper wall 27 having the piezo-electric element 29 secured thereto is preloaded by buoyancy of the mine 13 to a value of several hundred pounds thereby causing the wall 27 to be initially flexed outwardly and the piezo-electric element to be flexed therewith. The wall 27, it will be noted, is thinner than the cylindrical and bottom walls of the casings 24 and 18, and, therefore, has a much lower resonant frequency of vibration than the side and bottom walls. The resonant frequency of vibrations of wall 27 is also higher than the range of frequencies to be measured which may be of the order of one cycle per second to several hundred cycles per second. By providing a casing of the general configuration herein disclosed, the frequency of vibration of the top wall thereof is independent of the vibrations set up in the side and bottom walls of the casings. Furthermore, the strength of the signals generated by the detecting element 29 is proportional to the strength of the vibratory forces applied to the wall 27 and the intensity and general character of the vibrations resulting from the strumming of the cable are thus made manifest on recorder 16.

Obviously many modifications and variations of the present invention are possible in the light of the above teachings. It is therefore to be understood that within the scope of the appended claims, the invention may be practiced otherwise than as specifically described.

What is claimed as new and desired to be secured by Letters Patent of the United States is:

1. A signal detector and transducing device for measurement of cable strumming effects on a positively buoyant mass connected to an underwater anchor by means of a cable interposed therebetween, which comprises a stiff massive cup-like detector housing connected to said anchor, a complementary cup-like casing sealed to said housing in a manner to form a closed chamber, said cup-like casing including a closure plate of lesser stiffness than said housing but of sufficient structural stiffness to permit preloading of the plate by the buoyant forces acting on said mass with respect to the anchor, said cable being attached to a central portion of said plate and to said mass, a barium titanate crystal secured by cement to the interior face of said plate at a central portion thereof and sealed within said housing, said cement being of a suitable electro-conductive material, said plate being peripherally restrained and forming one electrode of said transducing device, a backing electrode disposed on the face of said crystal remote from said plate, and an amplifier disposed in said chamber and having the input thereof connected to the electrodes of said crystal.

2. A device for measuring the strumming of the mooring cable of a submerged mine caused by a tidal current comprising, in combination, a thick walled cup-like cylindrical casing having means for securing the casing to a mine anchor, a complementary cup-like casing having a relatively thin wall formed integrally with the upper portion of said complementary casing, means for effecting a water tight seal between the casing in a manner to form a sealed chamber therebetween, means on said thin wall for securing a mooring cable thereto at the central portion of the thin wall, a barium titanate crystal of circular configuration secured by electro-conductive cement to a central portion of the inner surface of said thin wall within said chamber and in juxtapostion to the cable securing means, a signal amplifier disposed within said chamber, means including a plurality of electrical connections for establishing a circuit between said crystal and the input of the amplifier, an outgoing electrical cable having a pair of conductors therein connected to the output of said amplifier, a gland for effecting a watertight seal between said electrical cable and the chamber, and a signal recorder connected to the conductors within said electrical cable for recording the signals received from said amplifier.

3. A device for sensing the amplitude and frequency of vibrations in a taut cable comprising a fixed thick walled casing, a complementary cup-like casing having a relatively thin flexible wall on one end thereof, means clamping said casings together in sealed relation to form a closed chamber, a circular piezo-electric element secured by electro-conductive cement to the inner surface of a central portion of said flexible wall for flexure therewith, and an eye bolt securing the cable to said flexible wall opposite said piezo-electric element whereby the vibrations of the cable are transmitted to said flexible wall only at said central portion thereof to flex said wall and crystal element and thereby generate electrical signals correlative with the frequency and amplitude of said vibrations.

4. A device according to claim 3 including an amplifier disposed within said chamber, means electrically connecting the input of said amplifier to said crystal element, a cable having a pair of conductors therein connected to the output of the amplifier and extending through said thick walled casing, means for hermetically sealing the electrical conductor cable to the casing, and a recorder connected to the conductors at the other end of the cable for making manifest the amplified signals received from said amplifier.

5. The device of claim 4 in which the flexible wall is of sufficient thickness to withstand a static load of at least 1000 pounds applied to said eye bolt and sufficiently flexible to vibrate in response to vibratory impulses within the range of one cycle per second to at least 500 cycles per second applied to the eye bolt.

6. The device of claim 5 in which the flexible wall is characterized by a resonant frequency less than the frequency of the remaining walls of the casing and in excess of the frequency of the vibratory forces applied thereto by said eye bolt.

References Cited in the file of this patent

UNITED STATES PATENTS

| 1,453,612 | Williams | May 1, 1923 |
| 2,233,992 | Wyckoff | Mar. 4, 1941 |
| 2,430,013 | Hansell | Nov. 14, 1947 |
| 2,477,246 | Gillespie | July 26, 1949 |
| 2,618,970 | Hitchcock | Nov. 25, 1952 |
| 2,803,129 | Bradfield | Aug. 20, 1957 |

FOREIGN PATENTS

| 145,691 | Great Britain | July 28, 1921 |